March 1, 1966  W. E. GRAY, JR  3,237,454
DIFFERENTIAL PRESSURE INDICATOR
Filed Oct. 31, 1962  3 Sheets-Sheet 1
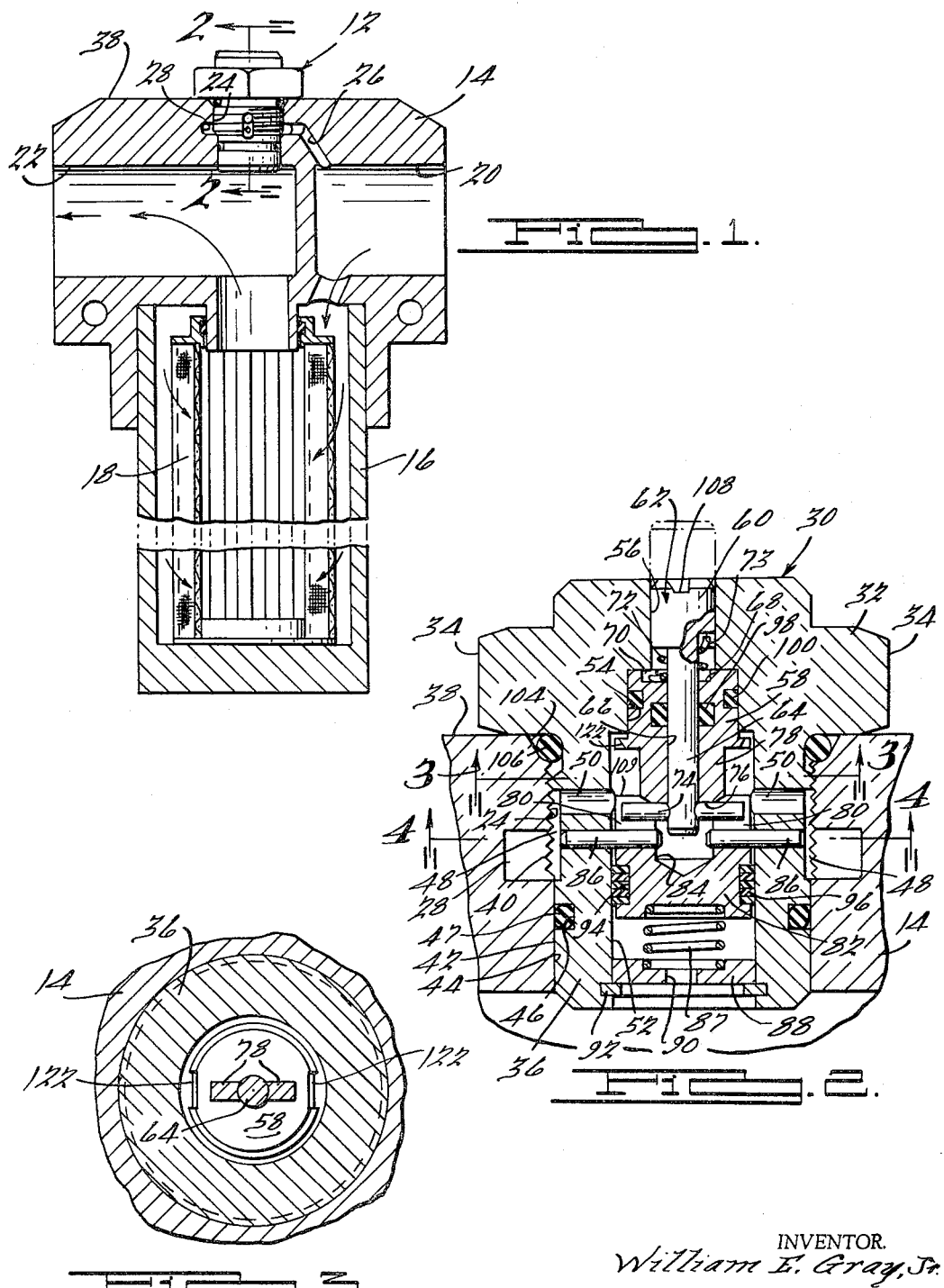
INVENTOR.
William E. Gray, Jr.
BY
Barnes, Dickey & Pierce
ATTORNEYS March 1, 1966 W. E. GRAY, JR 3,237,454
DIFFERENTIAL PRESSURE INDICATOR
Filed Oct. 31, 1962 3 Sheets-Sheet 2
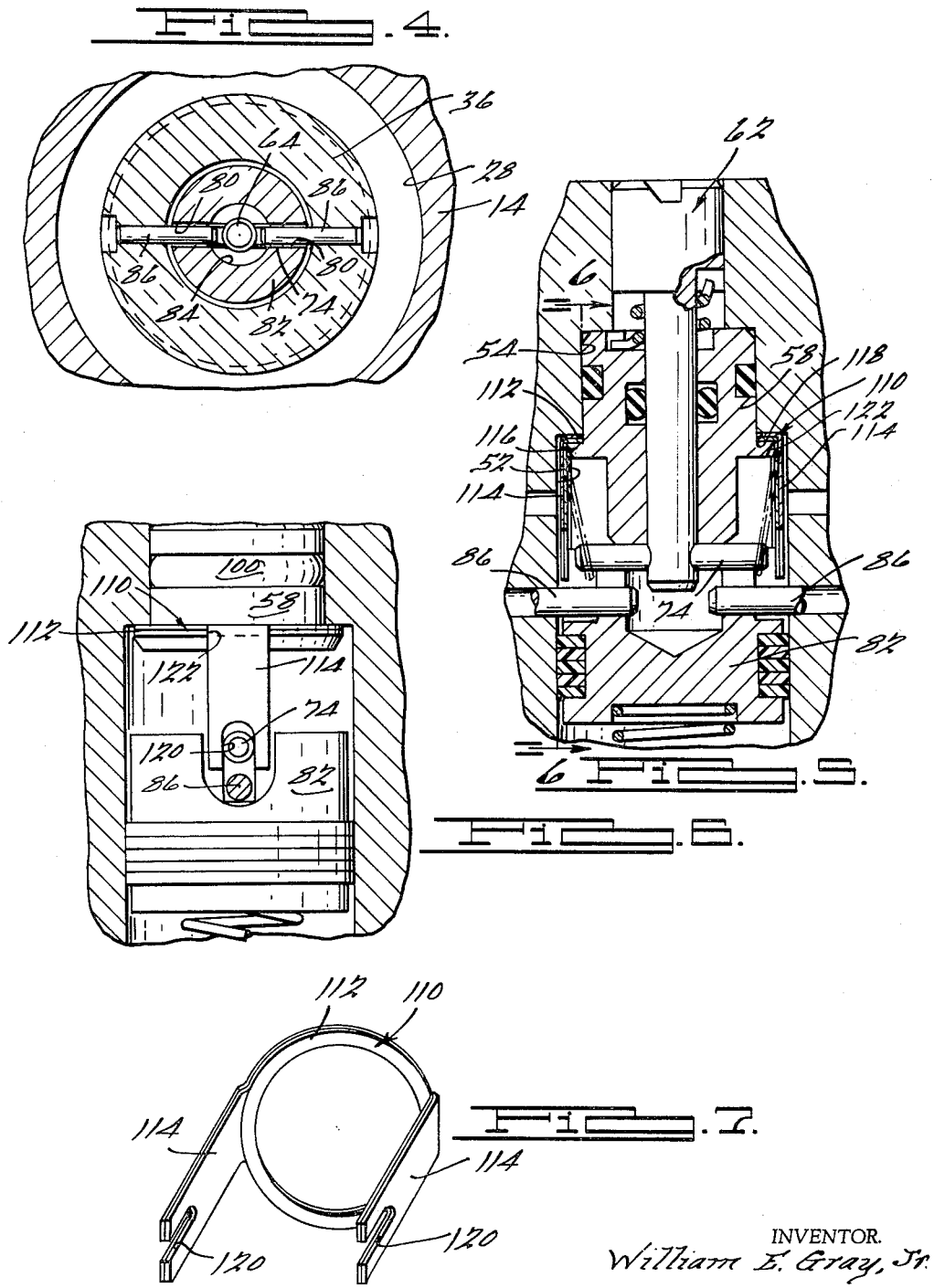
INVENTOR.
William E. Gray, Jr.

March 1, 1966   W. E. GRAY, JR   3,237,454
DIFFERENTIAL PRESSURE INDICATOR
Filed Oct. 31, 1962   3 Sheets-Sheet 3
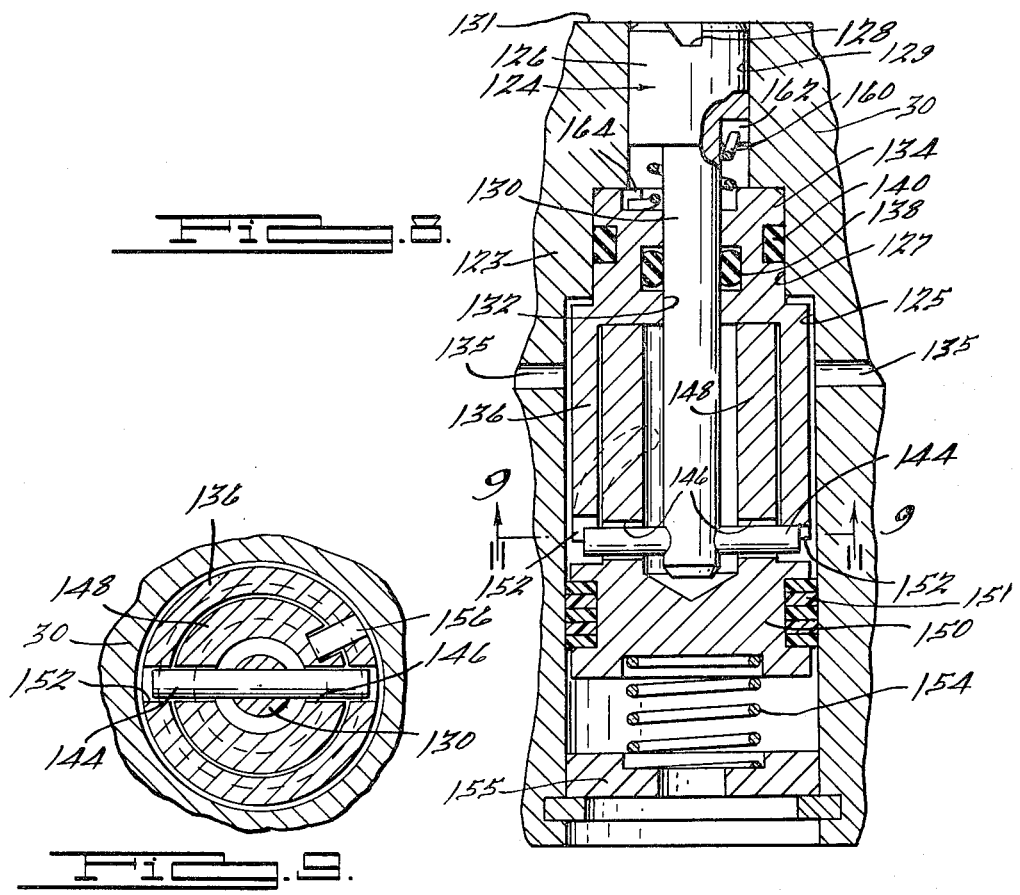
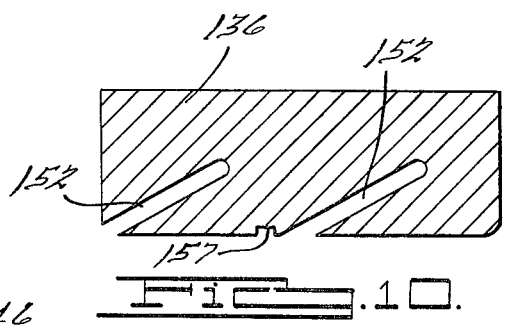
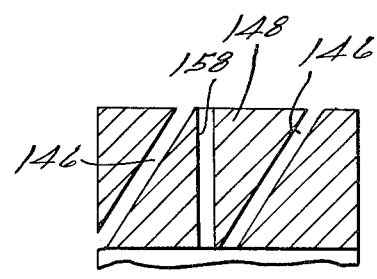
INVENTOR.
William E. Gray, Jr.
BY
Harness, Dickey & Pierce
ATTORNEYS

United States Patent Office 3,237,454
Patented Mar. 1, 1966

3,237,454
DIFFERENTIAL PRESSURE INDICATOR
William E. Gray, Jr., Huntington Woods, Mich., assignor, by mesne assignments, to Michigan-Dynamics, Inc., Detroit, Mich., a corporation of Michigan
Filed Oct. 31, 1962, Ser. No. 234,406
11 Claims. (Cl. 73—419)

This invention relates to differential pressure indicators and more particularly to a differential pressure indicator for sensing a difference in pressure between two different fluid media and actuating a linearly movable member in response thereto.

It is an object of the present invention to provide a differential pressure indicator which is highly accurate in operation and which will operate with consistency at varying pressure levels.

It is another object of the present invention to provide a differential pressure indicator which is completely sealed against external fluid leakage and in which the pressures exerted by the seals which prevent external fluid leakage do not significantly influence the pressures at which the movable parts of the mechanism will be actuated.

It is another object of the present invention to provide a differential pressure indicator which will remain in the indicating position after the differential pressure level has subsided, when the pump or other pressure-producing source has been turned off.

It is another object of the present invention to provide a differential pressure indicator which is relatively inexpensively manufactured, which is easy to maintain and reset, which is of compact and rugged construction and which is reliable in operation.

These and other objects of the present invention will become apparent from the following detailed description, taken in conjunction with the accompanying drawings, wherein:

FIGURE 1 is a vertical sectional view of a filter assembly showing a differential pressure indicator built in accordance with the present invention in operative association therewith;

FIG. 2 is a sectional view on an enlarged scale of a portion of the structure of FIG. 1, taken along the line 2—2 thereof;

FIGS. 3 and 4 are sectional views of the structure illustrated in FIG. 2, taken along the lines 3—3 and 4—4 thereof, respectively;

FIG. 5 is an enlarged fragmentary view of the structure illustrated in FIG. 2 with the addition of a temperature lock-out device 110;

FIG. 6 is a sectional view of the structure illustrated in FIG. 5, taken along the line 6—6 thereof;

FIG. 7 is a perspective view of the temperature lock-out device 110 of FIG. 5;

FIG. 8 is a sectional view of structure showing another form of the present invention;

FIG. 9 is a sectional view of the structure illustrated in FIG. 8, taken along the line 9—9 thereof;

FIG. 10 is a developed view on a reduced scale of the outer periphery of the sleeve portion 136 of the guide member 134 of FIG. 8; and FIG. 11 is a developed view on a reduced scale of a portion of the outer periphery of the sleeve portion 148 of the piston 150 of FIG. 8.

Referring now to the drawings and particularly to FIG. 1, a pressure indicating device 12 made in accordance with the present invention is representatively illustrated in association with a filter assembly including a casting 14, a housing 16, and a filter cartridge 18. The casting 14 is formed with an inlet passage 20 and an outlet passage 22. Fluid flows from the passage 20 into the interior of the housing 16, which is sealed at its upper end by the casting 14. In passing through the housing 16, fluid must flow through a filter cartridge 18, which is of hollow corrugated cylindrical form, and may be made from woven wire cloth or the like. From the interior of the cartridge 18, the clean fluid flows out of the device through the outlet passage 22, which is in communication with the interior of the filter cartridge 18. The pressure indicator 12 is screwed into a threaded bore 24 formed in the casting 14 in communication with the outlet passage 22 at its one end. A casting passage 26 provides communication between the inlet passage 20 and an annular groove 28 formed in the wall of the bore 24 and surrounding a portion of the pressure indicating device 12. By this means, and as will be more fully explained hereinafter, various parts and surfaces of the pressure indicating device 12 are placed in communication with both inlet and outlet fluid pressures.

Any barrier type filter will produce some drop in pressure from the upstream to the downstream side of the filter. With the build-up of contaminants on the cartridge 18, many of the pores of the cartridge become clogged, thereby increasing this pressure drop. Eventually, the filter may become sufficiently clogged that the resultant pressure drop is in excess of that permissible for proper functioning of the fluid system in which the filter is being used. The indicating device 12 is operable to compare the fluid pressures in the passages 20 and 22 and indicate the occurrence of an excess differential pressure therebetween. This indication notifies those responsible for maintaining the system that the filter cartridge 18 should be replaced or cleaned.

Referring now to FIGS. 2, 3 and 4, the pressure indicating device 12 includes a body member 30 having a head 32 provided with wrench-receiving flats 34. A sleeve portion 36 of the body member 30 depends from the head 32 and extends into the bore 24 of the casting 14, while the head 32 abuts against an exterior surface 38 of the casting. The upper end of the body member sleeve portion 36 is externally threaded, as indicated at 40, for threaded interengagement with the threads of the bore 24. The lower end of the sleeve 36 is of a circular cylindrical exterior configuration, as shown at 42, for conformable snug-fitting reception in a lower portion 44 of the bore 24. An annular groove 46 is provided in the outer periphery of the sleeve portion 36 for the reception of an O-ring 47 which seals against the bore portion 44 to prevent the leakage of inlet fluid in the groove 28 past the sleeve portion 36 into the outlet passage 22. The sleeve portion 36 also has a pair of opposite axially extending grooves 48 in the area of the threads 40 which provide fluid communication from the annular casting groove 28 to a pair of opposite radially extending passages 50 leading to a bore 52 defined by the hollow interior of the sleeve 36.

The bore 52 of the body member 30 is open to a smaller diameter bore 54 formed in the body member at one end of the sleve 36. In turn, the bore 54 opens into a smaller diameter coaxial bore 56 which is open to the top of the body member 30 at its other end. A combination guide and abutment member 58 is press fit in the bore 54, while the head 60 of an indicating member 62 is disposed in the bore 56 for axial and angular movement. The member 62 includes an elongated stem 64 which is snugly and slidably received in an axially extending bore 66 in the guide member 58. The guide member 58 has a counterbore 68 at its upper end surrounding the bore 66 and provided with an offset notch 70 for the reception of one end of a combined torsion and compression spring 72. The opposite end of the spring 72 is received in a recess 73 formed on the underside of the head portion 60 of the indicating member 62. With the head 60 in the position illustrated in solid lines in FIG. 2, the spring 72 is under compressive and torsional load and exerts a force on the member 62 that tends both to move the head 60 outwardly of the bore 56 and in rotation. Movement of the head 60 out of the body member 30 is normally prevented by a cross pin or transverse projection portion 74 carried by the stem 64 which engages the end surfaces 76 of a pair of spaced projections 78 integrally formed on the guide member 58 and extending away from the portion of the member 58 that is press fit in the bore 54. The pin 74 is press fit or otherwise secured in an opening at the lower end of the stem 64 and extends transversely of the stem.

Rotation of the indicating member 62 is prevented by the engagement of the pin 74 with the spaced parallel walls defining the opposite sides of a pair of axially extending slots 80 formed in the upper end of a piston 82 in alignment with projections 78 is a direction axially of the bore. The piston 82, which is reciprocable in the sleeve portion 36, has a blind bore 84 formed in its upper end between the slots 80 for receiving the terminus of the stem 64 of the indicating member 62. Rotation of the piston 82 is, in turn, prevented by a pair of pin-shaped key members 86, which are press fit in openings provided therefor in the sleeve portion 36 of the body member 30 and which project radially inwardly from the sleeve portion 36 to lie in the slots 80. The key members 86 permit reciprocation of the piston 82 in the bore 52 but prevent rotation of the piston. The piston 82 is biased in a direction toward the indicating member 62 by a coil spring 87, which bears against the lower end of the piston 82 and is seated on a generally washer-shaped retainer member 88 having a central opening 90 and bearing against a snap ring 92 secured in place at the lower end of the sleeve portion 36.

The operation of the pressure indicating device of the present invention is such that inlet fluid flows from the groove 28 up the grooves 48 formed on the body member 30 and through the passages 50 to the bore 52. In this location, the fluid will exert a pressure against the upper end of the piston 82 that is equal to the pressure within the inlet passage 20. Fluid within the outlet passage 22 is free to flow through the opening 90 to act against the lower end of the piston 82. Outlet fluid pressure is assisted by the spring 87. So long as the total force applied to the piston 82 by outlet fluid pressure and the spring 87 is greater than the opposing force exerted against the spring 87 by inlet fluid pressure, the piston 82 will remain in the position illustrated in FIG. 2, with the pin 74 received within the slots 80. However, if the filter 18 should become clogged to produce a sufficient pressure drop in the outlet passage 22, the difference in the forces exerted on the piston by inlet and outlet fluid pressure will become greater than the force exerted by spring 87. In such event, inlet fluid pressure will overcome the combined total of the forces exerted by outlet fluid pressure and the spring 87 and move the piston 82 downwardly in the bore 52 toward the retainer 88. When the piston 82 has moved sufficiently to clear the pin 74 from the slots 80, the indicating member 62 will be free to rotate under the influence of the combined torsional and compression spring 72. Rotation of the member 62 by ninety degrees will cause the pin 74 to move out of angular alignment with the projections 78, permitting the indicating member 62 to move axially upwardly to position its head 60 as indicated in broken lines in FIG. 2. This serves to visibly indicate the occurrence of a condition of excess differential pressure. It will be appreciated that the spring 87 may be selected for the particular differential pressure at which it is desired to have the indicating member 62 move to the raised "indicating" or "signaling" position.

It is to be noted that the piston 82 is provided on its outer periphery with an axially elongated annular groove 94 which receives a stack of annular seals 96 arranged in abutting relationship. The seals 96, which are desirably made from Teflon or other low coefficient of friction material, are split and they are therefore free to expand against the wall of the bore 52. The splits of the seals 96 are staggered to increase the effectiveness of the seals. The engagement of the seals 96 with the wall of the bore 52 provides only minor frictional resistance to the movement of the piston 82 and does not significantly affect the operation of the piston 82. While the arrangement of seals 96 does permit a slight amount of leakage past the piston 82, it will be appreciated that the flow is merely from the inlet passage 20 to the outlet passage 22 and is in minute quantities. This leakage does not affect the pressure at which the piston 82 will move and the leakage is not to the exterior of the assembly. This is to be contrasted with an arrangement in which O-ring seals are used to seal against fluid pressure displaceable members. O-ring seals do exert considerable frictional forces against the members which they seal and are utilized in the present invention to seal only stationary joints or joints in which the movable member does not have to be highly sensitive to varying pressures. For example, the guide member 58 is provided with O-ring seals 98 and 100 which bear against the stem 64 and the wall of the bore 54, respectively. While the frictional force applied to the stem 64 by the O-ring 98 serves to resist axial movement of the indicating member 62, the spring 72 exerts an axial force sufficient to overcome any frictional load imposed by the O-ring 98 and, therefore, the O-ring 98 does not impair its operation. The casting 14 is chamfered as indicated at 104 to accommodate another O-ring 106 bearing against the body member 30 adjacent the corner of the head portion 32 and sleeve portion 36 to further seal the unit against external leakage.

The head 60 of the indicating member 62 is provided with a unidirectional screw driver slot 108 by means of which the indicating member 62 may be reset. In resetting the unit after the differential pressure condition has been corrected, the member 62 is depressed to cause the pin 74 to move downwardly between the projections 78 until the pin 74 engages the upper end 109 of the piston 82. When the pin 74 engages the upper end 109 of the piston 82, continued downward movement of the indicating member 62 will force the piston 82 downwardly against the bias of the spring 87 until the pin 74 is disposed beneath the end surfaces 76 of the projections 78. At this point, the indicating member 62 is rotated in the only direction permitted by the configuration of the screw driver slot 108. After 90 degrees of rotation, the pin 74 will align with the slots 80 of the piston 82, permitting the piston to move upwardly by the force of the spring 87 and receive the pin 74 within its slots 80. At this point, the pin 74 will also be aligned with the end surfaces 76 of the projections 78, against which it will be held in abutment by the spring 72. The pin 74 will be restrained from rotating out of alignment with the surfaces 76 by its engagement with the surfaces defining the sides of the slots 80. The combined compression and torsion spring 72 is now loaded so that, upon movement of the piston 82 downwardly to clear the slots 80 from the pin 74, the spring 72 will again serve the previously mentioned function of rotating the indicating member 62 to a position out of alignment with the projections 78. It will be noted that if the differential pressure condition has not been corrected, the piston 82 will be in a lowered position when the indicating member 62 is depressed and rotated and the pin 74 will not be received in the slots 80. Thus, the indicating member 62 will immediately pop up again when the screw driver is removed from the slot 108.

FIGS. 5 and 6 illustrate the structure of FIGS. 1–4, with the addition of a temperature lock-out member 110, which is individually illustrated in FIG. 7. The member 110 includes an annular collar portion 112 having a pair of legs 114 extending from opposite sides thereof in a direction perpendicular to the plane of the collar portion 112. The collar portion 112 of the temperature lock-out member 110 is received between an annular flange 116 on the guide member 58 and an annular shoulder 118 between the bore 52 and the bore 54. It will be seen that the flange 116 extends radially outwardly from the guide member 58 in confronting relationship to the shoulder 118. The legs 114, which are of bimetallic structure, project downwardly along the side walls of the bore 52 and are intended to lie closely adjacent said side walls when the fluid in the bore 52 is at normal operating temperature. The legs 114 pass through notches 122 in the flange 116 which keep the legs 114 in alignment with the cross pin 74. When said fluid is excessively cold, the bimetallic legs 114 will move inwardly to the position illustrated in dotted lines in FIG. 5. Each of said legs has an axially extending slot 120 formed in the free end thereof and said slots receive the cross pin 74 to prevent rotation of the indicating member 62. The use of the temperature lock-out would be desirable in certain installations where the viscosity of the fluid being handled is such that excessive pressure drops would always be indicated between the two pressure media (e.g., the fluid in the passages 20 and 22) before the fluid was warmed up and not just when the filter cartridge 18 had become clogged.

The indicating member 62 of the device of FIGS. 1–6 is intended to move to a fully extended position upon the occurrence of any differential pressure in excess of a predetermined amount. The indicating member 62 is only released when the piston 82 is fully actuated to a position in which the slots 80 clear the pin 74. When this happens, the head 60 of the indicating member 62 "pops up" to the position indicated in dotted lines in FIG. 2.

FIGS. 8–11 illustrate another form of the invention in which any movement of a piston under the influence of a differential pressure will result in a corresponding movement of an indicating member to an indicating position, and the magnitude of the differential pressure will be indicated by the extent of movement of the indicating member, which is visible from the exterior of the unit. The particular mechanism illustrated in FIGS. 8–11 is adapted for use with the same casting 14 as is utilized in the prior embodiment of the invention and includes a body member 123 which is adapted to be secured in the bore 24 and which is formed with a main bore 125, an intermediate bore 127 and a small diameter bore 129 open to the top 131 of the body member 123. The device of FIGS. 8–11 utilizes an indicating member 124 having a head 126 snugly and slidably fitted in the bore 129 and provided with a screw driver slot 128. The indicating member 124 also includes an elongated stem portion 130 which is smoothly slidable in a bore 132 provided in a guide member 134 press fit within the intermediate bore 127. The guide member 134 has an integrally formed sleeve portion 136, the outer surface of which is spaced inwardly slightly from the wall defining the bore 125 to permit the entrance of fluid through passages 135 formed in the body member 123. Fluid leakage between the stem 130 and the bore 132 is prevented by an O-ring 138. Similarly, leakage between the exterior of the guide member 134 and the wall defining the bore 127 is prevented by an O-ring 140.

Operation of the indicating member 124 is effected through a cross pin or projection portion 144 which is carried by the stem 130 at the lower end thereof. The cross pin 144 projects radially outwardly at its opposite ends through helical slots 146 formed in an axially extending sleeve portion 148 of a piston 150. The piston 150 is axially reciprocable in the bore 125 and has seals 151 contacting the wall of the bore 125 beneath the sleeve portion 136. The terminal portions of the cross pin 144 are received in a pair of opposite helical slots 152 formed in the sleeve portion 136 of the guide member 134. The piston 150 is normally biased in a direction toward the head 126 of the indicating member 124 by a coil spring 154 engaging the side of the piston 150 opposite from the side thereof from which the sleeve portion 148 extends. The spring 154 is seated on a centrally open seat member 155. The guide member 134 is held against rotation by virtue of its press fit relation in the bore 127. The piston 150 is also held against rotation by means of a key 156 brazed in a notch 157 at the lower end of the sleeve portion 136 and projecting into an axially extending slot 158 formed in the outer periphery of the sleeve portion 148. The slots 152 and 146 extend in the same direction or are of the same hand. However, the slots 146 possess a greater lead or helix angle than the slots 152. The slots 152 are arranged diametrically opposite one another and the slots 146 are also arranged diametrically opposite one another. The slots 146 and 152 are just slightly wider than the pin 144 and are so arranged that a portion of the slots 146 is adapted to lie in radial confronting relationship to a portion of the slots 152 at all times, with the cross pin 144 extending through the confronting portions of said slots.

In the operation of the device of FIGS. 8–11, inlet fluid pressure is delivered to the bore 125 through the passages 135, where it reacts against the upper end of the piston 150. Outlet fluid pressure acts against the lower end of the piston 150 and this force is assisted by the force applied to the piston 150 by the spring 154. So long as the difference in forces applied to the piston 150 by inlet and outlet pressures is less than the force exerted by the spring 154, the piston 150 will remain in the position illustrated in FIG. 8. However, should the filter cartridge 18 or other intervening barrier between inlet and outlet fluid pressure become clogged or some other malfunction exist causing an excess differential fluid pressure, the force of inlet fluid pressure tending to move the piston 150 downwardly will overcome the combined force of the spring 154 and outlet pressure to move the piston 150 in a downward direction away from the head 126 of the indicating member 124. The more the piston 150 is moved, the more the spring 154 will be loaded to resist further piston movement. Accordingly, the magnitude of the existing differential pressure will be reflected in the extent of movement of the piston 150. As the piston 150 moves downwardly, the point at which the slots 146 radially confront the slots 152 will be both rotated and raised with respect to the sleeve portion 136. As the location of the confronting portions of said slots gradually moves upwardly, the cross pin 144 will be lifted to follow said locations as a result of a force applied thereto by a combined torsional and helical spring 160. The spring 160 is seated at its one end within a notch 162 formed on the underside of the indicating member head 126 and at its other end in a notch 164 formed in the guide member 134. The spring 160 applies both a rotational and an axial load to the indicating member 124, causing it to follow the locations of radial confrontation of the slots 146 and 152. The head 126 of the indicating member 124 may be graduated along the side wall thereof to indicate levels of differential pressure. Such graduations may be read with respect to the top surface 131 of the body member 123.

In the illustrated device of FIGS. 8–11, the lead of the helical slots 146 is twice the lead of the slots 152. For this reason, the travel of the indicating member 124 will be equal to the travel of the piston 150. Accordingly, the unit is very easily calibrated. Furthermore, the angle of the helical slots 152 is such that the torsional load of the pin 144 on the walls of said slots is absorbed by friction without producing a resultant axial force on the piston 150.

It is to be noted that if the pressure producing source is turned off while the indicating member 124 is in an indicating position, the indicating member will remain in that position until the device is reset. The unit is reset by applying an axially downward force to the head 126 of the indicating member 124. This is effective to move the piston 150 downwardly and at the same time the helical slots 146 and 152 will produce rotation of the indicating member 124. It will also be noted that if the condition producing the excess differential pressure continues to prevail, the indicating member 124 will immediately be raised again, to signal the excess differential pressure condition.

The springs 72 and 160 of the embodiments illustrated herein are intended to apply sufficient axial loads to their respective indicating members to overcome the frictional resistance to movement of said indicating members produced by the O-rings which engage them. It is to be appreciated, however, that both the indicating member 62 and the indicating member 124 are exposed to the fluid pressure of one of the fluid media being sensed. In fluid systems of high pressures, such pressures may be used to linearly move the indicating member, thus eliminating the need for any axial component of force delivered by the springs 72 or 160. Accordingly, the springs 72 or 160 may be purely torsion springs in some applications, with the axial force on the indicating member being derived from the portion of the indicating member that is exposed to fluid pressure.

While the indicating members 62 and 124 are illustrated as being intended for visual observation, it will be apparent that they could be used to trip a switch or perform any other function having the end result of indicating a condition of excess differential pressure. Accordingly, direct visual observation is not to be regarded as the only possible function of the indicating member. It is also to be understood that the showing of the indicating device in association with a filter is exemplary only and a variety of uses other than with filters are possible. The device has application to any situation where it is desired to compare fluid pressures prevailing at two different locations and determine the existence of a differential pressure, whether an increase in pressure or a decrease in pressure.

While it will be apparent that the preferred embodiments herein illustrated are well calculated to fulfill the objects above stated, it will be appreciated that the invention is susceptible to modification, variation and change without departing from the proper scope or fair meaning of the subjoined claims. For example, the embodiments of the invention illustrated herein show the use of a piston as the fluid displaceable member. It is to be understood that any fluid displaceable member or fluid motor can be used with equal facility. Accordingly, the expression "piston" as used in the claims is intended to include any fluid motor member.

What is claimed is:

1. A differential pressure indicator including a housing, a piston in said housing exposed to two different pressure media on opposite sides thereof, means operable to prevent angular movement of said piston, yieldable means biasing said piston in one direction and normally operable to maintain said piston in one position, said yieldable means being operable to assist the force applied to said piston by one of said media, an angularly and linearly movable indicating member having an elongated stem extending parallel to the direction of movement of said piston, a transverse projection on said stem, first means on said piston engageable with said projection when said piston is in said one position thereof operable to prevent angular movement of said indicating member relative to said piston, second means for preventing linear movement of said indicating member in the direction of its stem when said indicating member is in the angular position in which it is held by said first means, and means applying angular and linear forces to said indicating member for angularly and then linearly moving said indicating member upon the movement of said piston away from said one position thereof.

2. The structure set forth in claim 1 including a temperature lock-out member having a bimetallic leg extending substantially parallel to said stem and engageable with said transverse projection portion when the fluid media is of a temperature less than a predetermined amount, said leg being movable in a direction away from said stem and clear of said transverse projection portion when the fluid media is of a temperature greater than said predetermined amount.

3. A differential pressure indicator including a housing, a piston reciprocable in said housing exposed to two separate fluid pressure media on opposite sides thereof, means operable to prevent angular movement of said piston, yieldable means applying a force to said piston to assist one of said media and normally operable to maintain said piston in one position, an axially and angularly movable indicating member, means carried by said piston operable to prevent angular movement of said indicating member relative thereto when said piston is in the position in which it is normally maintained by said yieldable means, means for preventing axial movement of said indicating member when said indicating member is in the angular position in which it is held by said last-named means, and a combined compression and torsion spring associated with said indicating member for applying angular and linear forces to said indicating member.

4. A differential pressure indicator including a housing, a piston reciprocal in said housing exposed to two separate fluid pressure media on opposite sides thereof, a spring biasing said piston in a direction assisting one of said media and normally operable to maintain said piston in one position, an indicating member having an elongated stem, a guide member having a guide opening receiving said stem and supporting said stem for angular and linear movement, said guide member having a portion extending along one side of said stem provided with an end surface at one end thereof, a projection portion on one end of said stem engageable with said end surface in one angular position of said indicating member to prevent linear movement of said indicating member in one direction, means for preventing rotation of said piston relative to said housing, means on said piston engageable with said projection portion in said one position of said piston to hold said indicating member in said one angular position thereof, and means applying angular and linear forces to said indicating member for angularly and linearly moving said indicating member upon the movement of said piston away from the said one position thereof.

5. A differential pressure indicator including a housing, a piston in said housing exposed to two separate fluid media on opposite sides thereof, means operable to prevent angular movement of said piston, a spring biasing said piston in a direction assisting one of said fluid pressure media, a linearly and angularly movable indicating member having a transverse projection at one end thereof and a portion at the other end thereof which extends exteriorly of said housing upon linear movement of said indicating member in one direction, said piston having a slot for receiving said projection in one position thereof to prevent angular movement of said indicating member relative thereto, means in said housing providing a surface transverse to the direction of linear movement of said indicating member engageable with said projection when said indicating member is in the angular position in which it is held by said piston slot to prevent linear movement of said indicating member, and a combined torsion and compression spring connected at its one end to said indicating member and at its other end to said housing operable to angularly and then linearly move said indicating member upon the movement of said piston away from the said one position thereof.

6. A differential pressure indicator including a housing, a piston in said housing exposed to two separate fluid media on opposite sides thereof, yieldable means applying a force to said piston to assist one of said media, an indicating member having an elongated stem and a portion projecting from said housing upon movement of said indicating member in a given direction longitudinally of said stem, a guide member having a guide opening receiving said stem and supporting said stem for angular and longitudinal movement, a pin carried at one end of said stem extending transversely of said stem, said piston having a longitudinally extending slot for receiving said pin, a key member receivable in said slot for preventing rotation of said piston, a surface on said guide member engageable with said pin to prevent longitudinal movement of said indicating member when said pin is in said slot, and means applying angular and longitudinal forces to said indicating member to cause angular movement of said indicating member and then longitudinal movement of said indicating member upon the movement of said piston by an amount sufficient to cause said pin to clear said slot.

7. A differential pressure indicator including a housing, a piston in said housing exposed to two separate fluid pressure media on opposite sides thereof, means operable to prevent angular movement of said piston, yieldable means applying a force to said piston to assist the force applied to said piston by one of said media, an angularly and longitudinally movable indicating member having a transverse projection portion, a guide portion in said housing for supporting and guiding the movement of said indicating member, cooperating surfaces on said piston and said guide portion engageable with said projection portion operable to prevent rotation and axial movement of said indicating member relative to said guide member when said piston is in a given position, and means applying angular and radial forces to said indicating member for producing angular and linear movement of said indicating member upon the movement of said piston from said given position.

8. A differential pressure indicator including a housing, a reciprocably but nonrotatably movable piston in said housing exposed to two separate fluid pressure media on opposite sides thereof, yieldable means applying a force to said piston to assist the force applied to said piston by one of said media, an angularly and longitudinally movable indicating member having a transverse projection portion, cooperating surfaces of non-identical helical shape on said piston and a stationary portion in said housing, said surfaces being engageable with said projection portion and being arranged so that portions thereof are always in radially confronting relation, and means applying angular and linear forces to said indicating member whereby said indicating member will be moved linearly and angularly varying amounts in accordance with the magnitude of the difference in pressure between said fluid media.

9. The structure set forth in claim 8 in which said yieldable means comprises a compression spring for opposing movement of said piston in one direction with a successively greater force as said piston is moved.

10. The structure set forth in claim 8 in which said cooperating surfaces extend in the same direction but are of a differing angle.

11. A differential pressure indicator including a housing, a piston in said housing exposed to two separate fluid pressure media on opposite sides thereof, yieldable means applying a force to said piston to assist the force applied to said piston by one of said media, an angularly and longitudinally movable indicating member having a transverse projected portion, concentric annular portions in said housing and on said piston, said concentric annular portions having cooperating non-identical helical grooves arranged so that portions thereof are always in radially confronting relation, said projection portion extending into the radially confronting portions of said grooves, a combined torsion and compression spring connected at its one end to said indicating member and at its other end to said housing to cause said projection portion to follow the location of radial confrontation of said grooves upon the movement of said piston, and means for preventing rotation of said piston while permitting linear movement thereof.

References Cited by the Examiner
UNITED STATES PATENTS 2,673,464 3/1954 Zublin _____ 73—396 X
3,156,119 11/1964 Darnell _____ 73—419 X LOUIS R. PRINCE, *Primary Examiner.*

JOSEPH P. STRIZAK, RICHARD QUEISSER,
*Examiners.*